(12) United States Patent
Dai et al.

(10) Patent No.: US 11,399,332 B2
(45) Date of Patent: Jul. 26, 2022

(54) MESSAGE TRANSMISSION METHOD AND APPARATUS

(71) Applicant: ZTE Corporation, Shenzhen (CN)

(72) Inventors: Bo Dai, Shenzhen (CN); Xianming Chen, Shenzhen (CN); Kun Liu, Shenzhen (CN); Weiwei Yang, Shenzhen (CN); Huiying Fang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 86 days.

(21) Appl. No.: 16/611,034

(22) PCT Filed: Apr. 26, 2018

(86) PCT No.: PCT/CN2018/084677
§ 371 (c)(1),
(2) Date: Nov. 5, 2019

(87) PCT Pub. No.: WO2018/201970
PCT Pub. Date: Nov. 8, 2018

(65) Prior Publication Data
US 2020/0162996 A1    May 21, 2020

(30) Foreign Application Priority Data
May 5, 2017    (CN) .......................... 201710313873.1

(51) Int. Cl.
*H04W 48/08*    (2009.01)
*H04L 5/00*    (2006.01)

(52) U.S. Cl.
CPC ........... *H04W 48/08* (2013.01); *H04L 5/0053* (2013.01)

(58) Field of Classification Search
CPC ... H04W 48/12; H04W 72/042; H04W 76/28; H04W 72/0453; H04W 52/0216;
(Continued)

(56) References Cited

U.S. PATENT DOCUMENTS 8,130,637 B2 * 3/2012 Owens ................. H04L 12/462
370/218
2004/0224707 A1 * 11/2004 Jou ......................... H04W 4/20
455/466

(Continued)

FOREIGN PATENT DOCUMENTS

| CN | 101272601 A | 9/2008 |
| CN | 101601318 A | 12/2009 |

(Continued)

OTHER PUBLICATIONS

International Search Report for corresponding application PCT/CN2018/084677 filed Apr. 26, 2018; dated Jul. 18, 2018.
(Continued)

*Primary Examiner* — Joseph Arevalo
(74) *Attorney, Agent, or Firm* — Cantor Colburn LLP (57) ABSTRACT

Provided are a message transmission method and apparatus. One message transmission method includes: jointly carrying a system message through physical broadcast channels in multiple periods, and transmitting the system message to a terminal, where each of the physical broadcast channels in the multiple periods respectively carries a part of information of the system message.

15 Claims, 2 Drawing Sheets

Detect, by a second transmission node, a system message change indication signal sent by a first transmission node — S302

Acquire, by the second transmission node, a system message corresponding to the system message change indication signal when the system message change indication signal is detected — S304

(58) Field of Classification Search
CPC . H04W 68/00; H04W 52/0229; H04W 48/16; H04W 68/005; H04W 68/02; H04W 72/1289; H04W 76/27; H04W 28/06; H04W 48/08; H04W 52/0219; H04W 12/033; H04W 12/037; H04W 12/106; H04W 36/06; H04W 48/02; H04W 48/10; H04W 52/0251; H04W 52/50; H04W 72/00; H04W 72/005; H04W 72/02; H04W 72/0413; H04W 72/1284; H04W 72/14; H04W 74/002; H04W 74/0833; H04W 8/183; H04W 8/26; H04W 24/10; H04W 4/70; H04W 4/90; H04W 36/0085; H04W 36/0088; H04W 36/18; H04W 36/30; H04W 68/025; H04W 72/0446; H04W 72/082; H04W 72/1226; H04W 72/1273; H04W 76/19; H04W 24/00; H04W 24/04; H04W 4/14; H04W 56/001; H04W 60/04; H04W 64/00; H04W 68/04; H04W 72/04; H04W 72/044; H04W 76/11; H04W 76/50; H04W 80/08
USPC .................................. 370/329, 252, 311, 216
See application file for complete search history.

(56) References Cited

U.S. PATENT DOCUMENTS

| | | | |
|---|---|---|---|
| 2013/0010619 A1* | 1/2013 | Fong | H04W 72/0453 370/252 |
| 2013/0010964 A1* | 1/2013 | Fong | H04L 5/0092 380/277 |
| 2013/0258938 A1* | 10/2013 | Sagfors | H04W 48/12 370/312 |
| 2014/0233369 A1* | 8/2014 | Salam | H04L 41/0659 370/218 |
| 2014/0321381 A1* | 10/2014 | Guo | H04W 52/0216 370/329 |
| 2015/0071244 A1 | 3/2015 | Lee | |
| 2015/0173089 A1* | 6/2015 | Baghel | H04W 48/12 370/329 |
| 2016/0192292 A1* | 6/2016 | Hoglund | H04W 68/00 370/311 |
| 2016/0192434 A1* | 6/2016 | Du | H04W 76/28 370/329 |
| 2018/0255529 A1* | 9/2018 | Yu | H04W 68/02 |
| 2018/0279241 A1* | 9/2018 | Lee | H04W 56/001 |
| 2018/0343150 A1* | 11/2018 | Vaughn | H04L 25/4902 |
| 2019/0223153 A1* | 7/2019 | Kim | H04W 76/28 |

FOREIGN PATENT DOCUMENTS

| | | |
|---|---|---|
| CN | 101674211 A | 3/2010 |
| CN | 102415172 A | 4/2012 |
| CN | 102917437 A | 2/2013 |
| CN | 103546920 A | 1/2014 |
| CN | 105191418 A | 12/2015 |
| CN | 105578463 A | 5/2016 |
| WO | 2015046853 A1 | 4/2015 |
| WO | 2017028024 A1 | 2/2017 |

OTHER PUBLICATIONS

Catt, "NR PBCH and NR physical channel carried system information", 3GPP Draft, R1-1704538, vol. RAN WG1, No. Spokane USA, Apr. 2, 2017, XP051242679.

European Search Report for corresponding application EP 18 79 4523; Report dated Nov. 25, 2020.

Interdigital: "MIB contents for MTC UE", 3rd Generation Partnership Project, vol. RAN WG1, No. Malmo, Sweden, Oct. 4, 2015, XP051002653.

Nokia:, "System Information requirements and scheduling", 3GPP Draft vol. RAN WG2, No. Sorrento Italy, Jan. 12, 2007, XP050133222.

Ericsson, "On System Acquistion Time Reduction", 3GPP TSG-RAN1#88bis, Apr. 3-7, 2017, R1-1705188.

European Search Report for corresponding application EP 21178208; Report dated Sep. 6, 2021.

Chinese Office Action for corresponding application 201710313873. 1; Report dated Jan. 4, 2022.

Chinese Search Report for corresponding application 201710313873. 1; Report dated Dec. 23, 2021.

* cited by examiner

Jointly carry a system message through physical broadcast channels in multiple periods, and transmit the system message to a terminal, where each of the physical broadcast channels in the multiple periods respectively carries a part of information of the system message ~ S102

FIG. 1

Configure a system message change indication signal by a first transmission node ~ S202

Transmit, by the first transmission node, the system message change indication signal to a second transmission node ~ S204

FIG. 2

Detect, by a second transmission node, a system message change indication signal sent by a first transmission node ~ S302

Acquire, by the second transmission node, a system message corresponding to the system message change indication signal when the system message change indication signal is detected ~ S304

MESSAGE TRANSMISSION METHOD AND APPARATUS

CROSS-REFERENCE TO RELATED APPLICATIONS

This application is a US national phase application of international patent application No. PCT/CN2018/084677 filed on Apr. 26, 2018, which claims priority to Chinese patent application No. 201710313873.1, entitled "MESSAGE TRANSMISSION METHOD AND APPARATUS" and filed on May 5, 2017, the disclosures of which are incorporated therein by reference in their entireties.

TECHNICAL FIELD

The present disclosure relates to the field of communications and, in particular, relates to a message transmission method and apparatus.

BACKGROUND

In the related art, in a long term evolution (LTE) system, system message transmission includes two parts: one part is transmission of a master information block (MIB) through a physical broadcast channel and the other part is transmission of a system information block (SIB) through a physical downlink shared channel. The MIB mainly includes a radio frame number, a system bandwidth, SIB related configuration information, etc., and the SIB includes public configuration information such as access and cell reselection. The MIB is transmitted with a period of 40 ms, the SIB is transmitted with a period of 80 ms, and each system message is transmitted in each period. When a system message in the SIB is changed, a user equipment (UE) is informed of the change through a paging message. No MIB message change indication exists in the LTE system, so that the overhead of the message transmission in each period is large. A terminal cannot acquire the MIB message change and needs to perform reception periodically and repeatedly, and since no specific transmission indication of a system message change exists, power consumption overhead for the terminal to acquire the change of the system message in the SIB is also large.

No effective solution has yet been found for the above problems in the related art.

SUMMARY

The embodiments of the present disclosure provide a message transmission method and apparatus.

According to an embodiment of the present disclosure, a message transmission method is provided and the method includes: jointly carrying a system message through physical broadcast channels in multiple periods, and transmitting the system message to a terminal, where each of the physical broadcast channels in the multiple periods respectively carries a part of information of the system message.

Optionally, the system message includes a first message and the first message is transmitted over a physical broadcast channel in each period.

Optionally, the system message further includes a second message. Physical broadcast channels in multiple periods are used for jointly transmitting the second message, and the physical broadcast channel in each of the multiple periods is used for transmitting part of bits of the second message.

Optionally, multiple parts of the second message are combined to form a complete system message having a specified function.

Optionally, the system message further includes a third message and the third message is transmitted over physical broadcast channels in one or more periods.

Optionally, the first message and the second message are transmitted over physical broadcast channels in m periods, and the first message and the third message are transmitted over physical broadcast channels in n periods, where the m periods and the n periods are different periods.

Optionally, the first message includes: a system frame number (SFN) index; the second message includes: system information block (SIB) change indication information, access control information, remaining minimal system information (RMSI) transmission configuration information, and a measurement period indication field; and the third message includes: the SIB change indication information, the access control information, the RMSI transmission configuration information, and the measurement period indication field.

According to another embodiment of the present disclosure, a message transmission method is provided and the method includes: a first transmission node configures a system message change indication signal, and the first transmission node transmits the system message change indication signal to a second transmission node.

Optionally, the first transmission node configures the system message change indication signal by configuring the system message change indication signal in a system message.

Optionally, the first transmission node configures the system message change indication signal in the system message by configuring a location of a resource occupied by the system message change indication signal in the system message.

Optionally, the first transmission node transmits the system message change indication signal to the second transmission node in the following manner: when a system message is changed, the first transmission node transmits the system message change indication signal at a configured location, and changes the system message in a specified system message change period after the system message change indication signal is transmitted.

Optionally, a set of system messages correspond to one system message change indication signal; or a system message block corresponds to one system message change indication signal; or an MIB corresponds to one system message change indication signal, and an SIB corresponds to one system message change indication signal.

Optionally, the first transmission node configures the location of the resource occupied by the system message change indication signal in the system message through at least one of the following: the first transmission node configures a location of a time domain resource occupied by the system message change indication signal in the system message; or the first transmission node configures a location of a frequency domain resource occupied by the system message change indication signal in the system message.

Optionally, when the first transmission node only configures the location of the time domain resource occupied by the system message change indication signal in the system message, the location of the frequency domain resource occupied by the system message change indication signal is predefined. The predefined location of the frequency domain resource includes one of: a same location as a location of a frequency domain resource occupied by a physical broadcast channel; a predefined subcarrier location; or an entire bandwidth.

Optionally, the first transmission node transmits the system message change indication signal to the second transmission node through one of the following manners: the first transmission node transmits the system message change indication signal to the second transmission node on one orthogonal frequency division multiplexing (OFDM) symbol; the first transmission node transmits the system message change indication signal to the second transmission node on multiple OFDM symbols; the first transmission node repeatedly transmits the system message change indication signal to the second transmission node on the multiple OFDM symbols; or the first transmission node repeatedly transmits the system message change indication signal to the second transmission node on multiple sub-frames.

According to an embodiment of the present disclosure, another message transmission method is provided and the method includes: a second transmission node detects a system message change indication signal sent by a first transmission node, and the second transmission node acquires a system message corresponding to the system message change indication signal when the system message change indication signal is detected.

Optionally, the second transmission node detects the system message change indication signal sent by the first transmission node as follows: the second transmission node receives configuration information about a location of the system message change indication signal sent by the first transmission node, and detects the system message change indication signal according to the configuration information.

Optionally, the second transmission node acquires a system message corresponding to the system message change indication signal when the system message change indication signal is detected as follows: when the system message change indication signal is detected, the second transmission node receives a changed system message in a specified system message change period after the system message change indication signal is transmitted.

Optionally, a set of system messages correspond to one system message change indication signal; or a system message block corresponds to one system message change indication signal; or an MIB corresponds to one system message change indication signal, and an SIB corresponds to one system message change indication signal.

According to an embodiment of the present disclosure, a message transmission apparatus is provided and the apparatus includes: a transmission module, which is configured to jointly carry a system message through physical broadcast channels in multiple periods, and transmit the system message to a terminal, where each of the physical broadcast channels in the multiple periods respectively carries a part of information of the system message.

Optionally, the system message includes a first message and the first message is transmitted over a physical broadcast channel in each period.

Optionally, the system message further includes a second message. Physical broadcast channels in multiple periods are used for jointly transmitting the second message, and a physical broadcast channel in each of the multiple periods is used for transmitting part of bits of the second message.

Optionally, the system message further includes a third message and the third message is transmitted over physical broadcast channels in one or more periods.

According to another embodiment of the present disclosure, a message transmission apparatus is provided and the apparatus is applied to a first transmission node and includes: a configuration module, which is configured to configure a system message change indication signal; and a transmission module, which is configured to enable the first transmission node to transmit the system message change indication signal to a second transmission node.

Optionally, a set of system messages correspond to one system message change indication signal; or a system message block corresponds to one system message change indication signal; or an MIB corresponds to one system message change indication signal, and an SIB corresponds to one system message change indication signal.

According to another embodiment of the present disclosure, another message transmission apparatus is provided and the apparatus is applied to a second transmission node and includes: a detection module, which is configured to detect a system message change indication signal sent by a first transmission node; and an acquisition module, which is configured to acquire a system message corresponding to the system message change indication signal when the system message change indication signal is detected.

Optionally, the acquisition module includes: a receiving unit, which is configured to: when the system message change indication signal is detected, receive a changed system message in a specified system message change period after the system message change indication signal is transmitted.

According to another embodiment of the present disclosure, a storage medium is further provided. The storage medium is configured to store program codes for performing the following step: jointly carrying a system message through physical broadcast channels in multiple periods, and transmitting the system message to a terminal, where each of the physical broadcast channels in the multiple periods respectively carries a part of information of the system message.

BRIEF DESCRIPTION OF DRAWINGS

The drawings described herein are used to provide a further understanding of the present disclosure, and form a part of the present application. The exemplary embodiments and description thereof in the present disclosure are used to explain the present disclosure and do not limit the present disclosure in any improper way. In the drawings.

DETAILED DESCRIPTION

Hereinafter the present disclosure will be described in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

According to the present disclosure, physical broadcast channels in multiple periods are adopted for jointly carrying a system message, and the system message is transmitted to a terminal. Each of the physical broadcast channels in the multiple periods respectively carries a part of information of the system message. Bits for transmitting messages over the physical broadcast channels are reduced, and more bits are reserved for future expansion, and the system message transmitted over the physical broadcast channels in each period is reduced, which solves the technical problem in the related art that excessive transmission overhead is caused by transmitting the system message in each period, and saves system overhead and internet resources.

Embodiment 1

Figure 1:
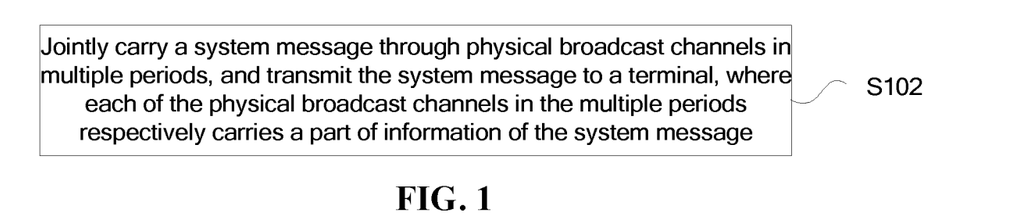
FIG. 1 is a flowchart of a message transmission method according to an embodiment of the present disclosure.

In the embodiment, a message transmission method is provided. FIG. 1 is a flowchart of a message transmission method according to an embodiment of the present disclosure. As shown in FIG. 1, the method includes steps described below.

In step S102, physical broadcast channels in multiple periods are adopted for jointly carrying a system message, and the system message is transmitted to a terminal. Each of the physical broadcast channels in the multiple periods respectively carries a part of information of the system message.

Through the above step, physical broadcast channels in multiple periods are adopted for jointly carrying a system message, and the system message is transmitted to the terminal, where each of the physical broadcast channels in the multiple periods respectively carries a part of information of the system message. Physical broadcast channels in multiple periods are adopted for jointly carrying a system message, so that bits for transmitting messages over the physical broadcast channels are reduced, more bits are reserved for future expansion, and the system message transmitted over the physical broadcast channels in each period is reduced. The technical problem of excessive transmission overhead caused by transmitting the system message in each period in the related art is solved, and system overhead and internet resources are saved.

Optionally, an execution body of the above step may be a network element on a network side, such as a base station, etc., but is not limited thereto. The transmission in the embodiment includes sending and receiving. As for the base station, the transmission refers to sending, and for the terminal, the transmission refers to receiving. The method may be applied to the base station or the terminal.

Optionally, the system message includes a first message and the first message is transmitted over a physical broadcast channel in each period.

Optionally, the system message further includes a second message. Physical broadcast channels in multiple periods are adopted for jointly transmitting the second message, where the physical broadcast channel in each of the multiple periods is adopted for transmitting part of bits of the second message. Optionally, multiple parts of the second message are combined to form a complete system message having a specified function.

Optionally, the system message further includes a third message. The third message is transmitted over physical broadcast channels in one or more periods. Optionally, the first message and the second message are transmitted over physical broadcast channels in m periods, and the first message and the third message are transmitted over physical broadcast channels in n periods, where the m periods and the n periods are different periods.

Optionally, the first message includes: a system frame number (SFN) index; the second message includes: SIB change indication information, access control information, RMSI transmission configuration information, and a measurement period indication field; and the third message includes: the SIB change indication information, the access control information, the RMSI transmission configuration information, and the measurement period indication field.

In the embodiment, the first message and the second message may have multiple combined scenarios, which are exemplified as follows.

The first message includes the system frame number (SFN) index, and the second message includes the SIB change indication information.

The first message includes the SFN index, and the second message includes the access control information.

The first message includes the SFN index, and the second message includes the remaining minimal system information (RMSI) transmission configuration information.

In the embodiment, when three types of messages are included, the first message, the second message and the third message may have multiple combined scenarios, which are exemplified as follows.

The first message includes the SFN index, the second message includes the SIB change indication information, and the third message includes the access control information.

The first message includes the SFN index, the second message includes the measurement period indication field, and the third message includes the RMSI transmission configuration information.

The first message, the second message, and the third message are not limited to the above-mentioned messages, and may also include other existing messages or newly added messages, such as customized messages.

Figure 2:
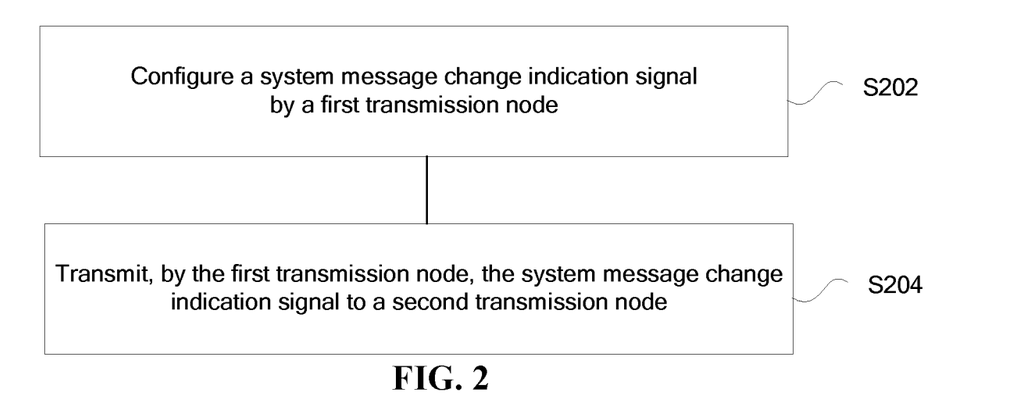
FIG. 2 is a flowchart of another message transmission method according to an embodiment of the present disclosure.

In the embodiment, another message transmission method is provided. FIG. 2 is a flowchart of another message transmission method according to an embodiment of the present disclosure. As shown in FIG. 2, the method includes steps described below.

In step S202, a first transmission node configures a system message change indication signal.

In step S204, the first transmission node transmits the system message change indication signal to a second transmission node.

Figure 3:
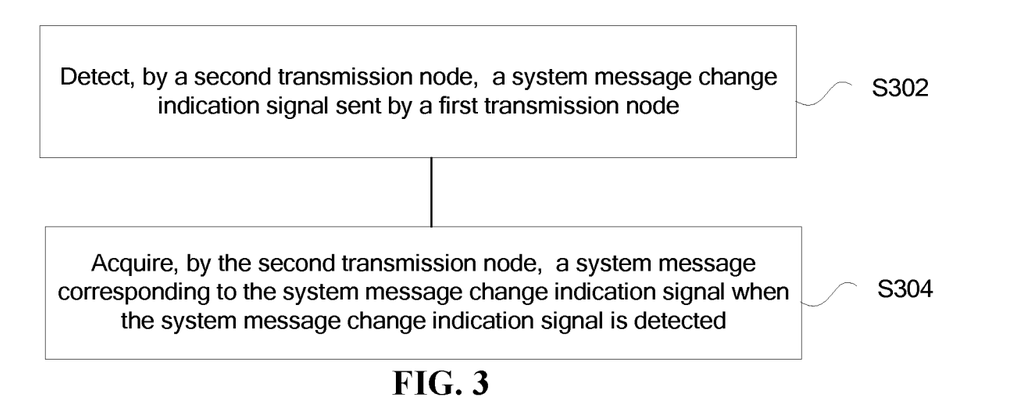
FIG. 3 is a flowchart of another message transmission method according to an embodiment of the present disclosure.

In the embodiment, another message transmission method is provided. FIG. 3 is a flowchart of another message transmission method according to an embodiment of the present disclosure. As shown in FIG. 3, the method includes steps described below.

In step S302, a second transmission node detects a system message change indication signal sent by a first transmission node.

In step S304, the second transmission node acquires a system message corresponding to the system message change indication signal when the system message change indication signal is detected.

In the embodiment, the first transmission node includes multiple types of nodes such as a base station, a terminal, a relay, and the like, and the second transmission node includes multiple types of nodes such as the base station, the terminal, the relay, and the like.

Optionally, the first transmission node configures the system message change indication signal by configuring the system message change indication signal in the system message.

Optionally, the first transmission node configures the system message change indication signal in the system message by configuring a location of a resource occupied by the system message change indication signal in the system message.

Optionally, the first transmission node transmits the system message change indication signal to the second transmission node through the flowing steps.

In S11, the first transmission node transmits the system message change indication signal at a configured location when a system message is changed.

In S12, the first transmission node changes the system message in a specified system message change period after the system message change indication signal is transmitted, where the specified system message change period may be a first system message change period.

Optionally, a set of system messages correspond to one system message change indication signal; or a system message block corresponds to one system message change indication signal; or an MIB corresponds to a system message change indication signal, and an SIB corresponds to a system message change indication signal.

Optionally, the first transmission node configures the location of the resource occupied by the system message change indication signal in the system message through at least one of the following: the first transmission node configures a location of a time domain resource occupied by the system message change indication signal in the system message; or the first transmission node configures a location of a frequency domain resource occupied by the system message change indication signal in the system message.

Optionally, when the first transmission node only configures the location of the time domain resource occupied by the system message change indication signal in the system message, the location of the frequency domain resource occupied by the system message change indication signal is predefined. The predefined location of the frequency domain resource includes one of: a same location as a location of a frequency domain resource occupied by a physical broadcast channel; a predefined subcarrier location; or the entire bandwidth.

Optionally, the first transmission node transmits the system message change indication signal to the second transmission node through one of the following manners: the first transmission node transmits the system message change indication signal to the second transmission node on one orthogonal frequency division multiplexing (OFDM) symbol; the first transmission node transmits the system message change indication signal to the second transmission node on multiple OFDM symbols; the first transmission node repeatedly transmits the system message change indication signal to the second transmission node on multiple OFDM symbols; or the first transmission node repeatedly transmits the system message change indication signal to the second transmission node on multiple sub-frames.

Optionally, the second transmission node detects the system message change indication signal sent by the first transmission node through the following steps: the second transmission node receives configuration information about a location of the system message change indication signal sent by the first transmission node; and the second transmission node detects the system message change indication signal according to the configuration information.

Optionally, when the system message change indication signal is detected, the second transmission node acquires a system message corresponding to the system message change indication signal through the following step: when the system message change indication signal is detected, the second transmission node receives a changed system message in a specified system message change period after the system message change indication signal is transmitted.

From the description of the above embodiments, it will be apparent to those skilled in the art that the methods in the embodiments described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the existing art, may be embodied in the form of a software product. The computer software product is stored in a storage medium (such as a read-only memory (ROM)/random access memory (RAM), a magnetic disk or an optical disk) and the storage medium includes several instructions for enabling a terminal device (which may be a mobile phone, a computer, a server, a network device, or the like) to perform the method according to each embodiment of the present disclosure.

Embodiment 2

A message transmission apparatus is further provided in the embodiment. The apparatus is configured to implement the above-mentioned embodiments and preferred embodiments. What has been described will not be repeated. As used below, the term "module" may be software, hardware or a combination thereof capable of implementing predetermined functions.

Although the apparatuses described in the following embodiments are preferably implemented in software, however, implementations in hardware or a combination of software and hardware are also possible and conceived.

Figure 4:
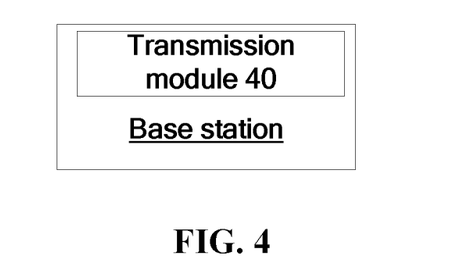
FIG. 4 is a structural block diagram of a message transmission apparatus according to an embodiment of the present disclosure.

FIG. 4 is a structural block diagram of a message transmission apparatus according to an embodiment of the present disclosure. As shown in FIG. 4, the apparatus may be applied to a base station and includes a transmission module 40. The transmission module 40 is configured to jointly carry a system message through physical broadcast channels in multiple periods, and transmit the system message to a terminal. The physical broadcast channels in the multiple periods respectively carry parts of information of the system message.

Optionally, the system message includes a first message and the first message is transmitted over a physical broadcast channel in each period.

Optionally, the system message further includes a second message. Physical broadcast channels in multiple periods are adopted for jointly transmitting the second message, where the physical broadcast channel in each of the multiple periods is adopted for transmitting part of bits of the second message.

Optionally, the system message further includes a third message and the third message is transmitted over physical broadcast channels in one or more periods.

Figure 5:
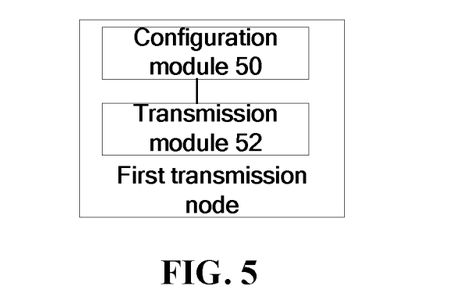
FIG. 5 is a structural block diagram of another message transmission apparatus according to an embodiment of the present disclosure.

FIG. 5 is a structural block diagram of another message transmission apparatus according to an embodiment of the present disclosure. As shown in FIG. 5, the apparatus is applied to a first transmission node and includes a configuration module 50 and a transmission module 52.

The configuration module 50 is configured to configure a system message change indication signal.

The transmission module 52 is configured to enable the first transmission node to transmit the system message change indication signal to a second transmission node.

Figure 6:
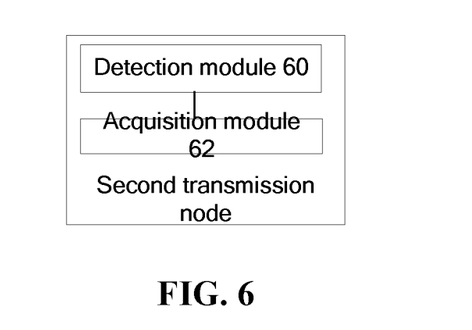
FIG. 6 is a structural block diagram of another message transmission apparatus according to an embodiment of the present disclosure.

FIG. 6 is a structural block diagram of another message transmission apparatus according to an embodiment of the present disclosure. As shown in FIG. 6, the apparatus is applied to a second transmission node and includes a detection module 60 and an acquisition module 62.

The detection module 60 is configured to detect a system message change indication signal sent by a first transmission node.

The acquisition module 62 is configured to acquire a system message corresponding to the system message change indication signal when the system message change indication signal is detected.

In the embodiment, a set of system messages correspond to one system message change indication signal; or a system message block corresponds to one system message change indication signal; or an MIB corresponds to one system message change indication signal, or an SIB corresponds to one system message change indication signal.

Optionally, the acquisition module includes a receiving unit. The receiving unit is configured to: when the system message change indication signal is detected, receive a changed system message in a specified system message change period after the system message change indication signal is transmitted.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment 3

The embodiment is used for describing the present application in detail in conjunction with examples according to an optional embodiment of the present disclosure.

In order to reduce the overhead of the system message and reduce the power consumed by a terminal for obtaining a system message, the system message being jointly carried by physical broadcast channels in multiple periods and a system message change indication signal are proposed in the embodiment to solve technical problems existed in the related art. In the embodiment, through jointly carrying the system message by the physical broadcast channels in multiple periods, bits for transmitting messages over the physical broadcast channels are reduced, and more bits are reserved for future expansion. In addition, through sending the system message change indication signal, the power consumed by the terminal for obtaining the system message is reduced.

In the embodiment, the physical broadcast channels in multiple periods are adopted for jointly carrying the system message, where each of the physical broadcast channels in the multiple periods carries a part of the system message. Two different scenarios are taken as an example.

Scenario 1:

The system message transmitted over the physical broadcast channels includes message 1 and message 2. Message 1 is transmitted over the physical broadcast channel in each period. Physical broadcast channels in multiple periods are adopted for jointly transmitting message 2, and the physical broadcast channel in each of the multiple periods is adopted for transmitting a part of bits of message 2.

The system message jointly transmitted over the physical broadcast channels in multiple periods includes a specific system message. A part of the system message is transmitted over a physical broadcast channel in each of the multiple periods, and multiple parts of the system messages are combined to form a complete system message having a specified function.

Scenario 1 further includes multiple instances.

Application Instance 1

The system message includes: an SFN index and SIB change indication information. For example, the SIB change indication information has 5 bits, and physical broadcast channels in 2 periods are adopted for jointly transmitting SIB change indication information, where 2 bits of the SIB change indication information are transmitted over the physical broadcast channel in one of the 2 periods, and the remaining 3 bits of the SIB change indication information are transmitted over the physical broadcast channel in the other period. The SFN index is transmitted over the physical broadcast channel in each period.

For a base station, physical broadcast channels in every 2 consecutive periods are adopted for jointly transmitting the SIB change indication information. Specifically, 2 bits of the SIB change indication information are transmitted over the physical broadcast channel in one period, and the remaining 3 bits of the SIB change indication information are transmitted over the physical broadcast channel in the other period; the SFN index is transmitted over the physical broadcast channel in each period.

For a terminal, the physical broadcast channels in every 2 consecutive periods are adopted for jointly receiving the SIB change indication information. Specifically, 2 bits of the SIB change indication information are received over the physical broadcast channel in one period, and the remaining 3 bits of the SIB change indication information are received over the physical broadcast channel in the other period; the SFN index is received over the physical broadcast channel in a period.

Application Instance 2

The system message includes: an SFN index and access control information. For example, the access control information has 4 bits, and physical broadcast channels in 2 periods are adopted for jointly transmitting the access control information. Specifically, 2 bits of the access control information are transmitted over the physical broadcast channel in one period of the 2 periods, and the remaining 2 bits of the access control information are transmitted over the physical broadcast channel in the other period; the SFN index is transmitted over the physical broadcast channel in each period.

It is assumed that the physical broadcast channel period is 4 radio frames, and the access control information is jointly transmitted every 2 periods from the first radio frame. The physical broadcast channel periods are numbered from 0, and the first 2 bits of the access control information are transmitted over a physical broadcast channel in a period having an even-numbered index, and the remaining 2 bits of the access control information are transmitted in a period having an odd-numbered index.

For the base station, the system message is sent according to the above method; for the terminal, the system message is received according to the above method.

Application Instance 3

The system message includes: an SFN index and RMSI transmission configuration information (3 to 5 bit below 6 GHz, 4 to 7 bits above 6 GHz), such as the RMSI transmission configuration information (5 bit below 6 GHz, 7 bits above 6 GHz). The physical broadcast channels in 2 periods are adopted for jointly transmitting the RMSI configuration information. 2 bits of the access control information are transmitted over the physical broadcast channel in one period, and the remaining bits of the RMSI configuration information are transmitted over the physical broadcast channel in the other period; the SFN index is transmitted over the physical broadcast channel in each period.

For the base station, the system message is sent according to the above method; for the terminal, the system message is received according to the above method.

Scenario 2:

The system message transmitted over the physical broadcast channels includes: message 1, message 2, and message 3. Message 1 is transmitted over the physical broadcast channel in each period, and physical broadcast channels in multiple periods are adopted for jointly transmitting message 2 and message 3. Specifically, message 1 and message 2 are transmitted over the physical broadcast channel in one period, and message 1 and message 3 are transmitted over the physical broadcast channel in another period.

Scenario 2 also includes multiple application instances.

Application Instance 1

The system message transmitted over the physical broadcast channels includes an SFN index, SIB change indication information, and access control information. The SFN index is transmitted over the physical broadcast channel in each period, and physical broadcast channels in 2 periods are adopted for jointly transmitting the SIB change indication information and the access control information. The SFN index and the SIB change indication information are transmitted over a physical broadcast channel in one period of the 2 periods, and the SFN index and the access control information are transmitted over a physical broadcast channel in the other period.

For a base station, the physical broadcast channels in every 2 consecutive periods are adopted for jointly transmitting the SIB change indication information and access control information. Specifically, the SIB change indication information is transmitted over the physical broadcast channel in one period, and the access control information is transmitted over the physical broadcast channel in the other period. The SFN index is transmitted over the physical broadcast channel in each period.

For a terminal, the physical broadcast channels in every 2 consecutive periods are adopted for jointly receiving the SIB change indication information and access control information. Specifically, the SIB change indication information is received over the physical broadcast channel in one period of 2 consecutive periods, and the access control information is received over the physical broadcast channel in the other period of 2 consecutive periods. The SFN index is received over the physical broadcast channel in one period.

Application Instance 2

The system message transmitted over the physical broadcast channels includes: an SFN index, a measurement period indication field, and RMSI transmission configuration information, where the SFN index is transmitted over the physical broadcast channel in each period, and the physical broadcast channels in 2 periods are adopted for jointly transmitting the measurement period indication field and the RMSI transmission configuration information. Specifically, the SFN index and the measurement period indication field are transmitted over the physical broadcast channel in one period of the 2 periods, and the SFN index and the RMSI transmission configuration information are transmitted over the physical broadcast channel in the other period of the 2 periods.

For the base station, the system message is sent according to the above method; for the terminal, the system message is received according to the above method.

According to the embodiment, through jointly transmitting the system message over physical broadcast channels in multiple periods, bits for transmitting messages over the physical broadcast channels are reduced, more bits are reserved for future expansion, and the system message transmitted over the physical broadcast channel in each period is reduced.

On the other hand, in an embodiment, a first transmission node transmits a system message change indication signal; a second transmission node detects the system message change indication signal, and when the system message change indication signal is detected, the second transmission node detects a system message corresponding to the system message change indication signal.

Optionally, the first transmission node configures a location of the system message change indication signal in the system message. When the system message is changed, the first transmission node transmits the system message change indication signal at the configured location and changes the system message in a first system message change period after the system message change indication signal is transmitted.

The second transmission node receives configuration information about the location of the system message change indication signal sent by the first transmission node; according to the configuration information, the second transmission node detects the system message change indication signal, and when the system message change indication signal is detected, the second transmission node receives the changed system message in the first system message change period after the system message change indication signal is transmitted.

In the embodiment, a set of system messages correspond to one system message change indication signal, or a system message block corresponds to one system message change indication signal, or an MIB corresponds to one system message change indication signal, or an SIB corresponds to one system message change indication signal.

Time domain locations of multiple system message change indication signals are configured in the system message. The system message change indication signals may be transmitted on one OFDM symbol, or may also be transmitted on multiple OFDM symbols, or may be repeatedly transmitted on multiple OFDM symbols, or repeatedly transmitted on multiple sub-frames.

A frequency domain location corresponding to the system message change indication signal is configured in the system message, and may be a predefined bandwidth such as the entire system bandwidth, or may be configured to fixedly occupy 12 subcarriers, or may be the same as the frequency domain location of the physical broadcast channel. For example, in an LTE system, the physical broadcast channel occupies 72 subcarriers, and in an NR system, the physical broadcast channel occupies 288 subcarriers, and correspondingly, the system message change indication signal in the LTE system occupies 72 subcarriers, and the system message change indication signal in the NR system occupies 288 subcarriers.

A sequence corresponding to the system message change indication signal includes at least one of a zadoff-chu (ZC) sequence, an M sequence, a Gold sequence, or a PN70800 sequence. For example, the system message change indication signal is generated by the ZC sequence, and a root index and a cyclic shift index are selected according to a cell identity (ID) to generate the ZC sequence; or the ZC sequence is generated according to the root index and the cyclic shift index configured by the system message. Alternatively, the system message change indication signal is generated by the M sequence and the Gold sequence, cells are grouped according to cell IDs, cells in a same group use a same Gold sequence and different M sequences, and cells in different groups use different Gold sequences and a same M sequence. Alternatively, the system messages change indication signal is generated by the PN70800 sequence, and the PN70800 sequence is generated based on the cell ID.

Optionally, sequences of system message change indication signals corresponding to different cells are different; the time-frequency locations of system message change indication signals corresponding to different cells may be the same or different.

In the embodiment, the first transmission node includes multiple types of nodes such as a base station, a terminal, a relay, and the like; the second transmission node includes multiple types of nodes such as the base station, the terminal, the relay, and the like.

Optionally, the system message includes an MIB and an SIB, and the SIB includes multiple SIBs, such as SIB1, SIB2, and SIB3.

A location of the system message change indication signal configured by a base station in the system message includes a period of the system message change indication signal, a starting sub-frame and the number of repeated transmissions.

The system message change indication signal is predefined in a starting OFDM symbol in the sub-frame, or configured in the system message.

The MIB and all SIBs correspond to one system message change indication signal; or the MIB corresponds to one system message change indication signal, and all SIBs correspond to another system message change indication signal; or the MIB corresponds to one system message change indication signal, SIB1 corresponds to one system message change indication signal, and the remaining SIBs correspond to another system message change indication signal; or the MIB and SIB1 correspond to one system message change indication signal, and the remaining SIBs correspond to another system message change indication signal; or the MIB, SIB1 and SIB2 correspond to one system message change indication signal, and the remaining SIBs correspond to another system message change indication signal; the MIB, SIB1, SIB2, and SIB3 correspond to one system message change indication signal, and the remaining SIBs correspond to another system message change indication signal.

When the system message is changed, the base station transmits the system message change indication signal at the nearest configured location, and changes the system message in the first system message change period after the system message change indication signal is transmitted.

Optionally, the terminal receives configuration information about the location of the system message change indication signal sent by the base station; according to the configuration information, the terminal detects the system message change indication signal at the corresponding location, and when the system message change indication signal is detected, the terminal receives, according to the correspondence between the system message change indication signal and the system message, a changed system message in the first system message change period after the system message change indication signal is transmitted.

In the embodiment, the system message change indication signal is transmitted so as to reduce the overhead of transmitting the system message change indication. The transmission in a cell is performed at a public time, and all idle-state terminals and/or connected-state terminals performs detection at the public time to avoid signaling overhead and delay of notification for each UE. Through transmission in a signal form instead of a channel form, the detection complexity of the terminal can be reduced, and the resource overhead of transmitting the information in the system can also be reduced.

Embodiment 4

The embodiment of the present disclosure further provides a storage medium. Optionally, in the embodiment, the storage medium may be configured to store program codes for performing a step described below.

In S1, physical broadcast channels in multiple periods are adopted for jointly carrying a system message, and the system message is transmitted to a terminal, where each of the physical broadcast channel in the multiple periods carries a part of information of the system message.

Optionally, in the embodiment, the above storage medium may include, but is not limited to, a USB flash disk, a Read-Only Memory (ROM), a Random Access Memory (RAM), a mobile hard disk, a magnetic disk, an optical disk or another medium capable of storing program codes.

Optionally, in the embodiment, according to the stored program code in the storage medium, the processor performs a following step: a system message is jointly carried by physical broadcast channels in multiple periods and transmitted to a terminal, where the physical broadcast channel in each of the multiple periods carries a part of information of the system message.

Optionally, for examples in the embodiment, reference may be made to the examples described in the embodiments and optional embodiments described above, and the examples will not be repeated in the embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure should fall within the scope of the present disclosure.

What is claimed is:

1. A message transmission method, comprising:
configuring, by a first transmission node, a system message change indication signal; and
transmitting, by the first transmission node, the system message change indication signal to a second transmission node;
wherein configuring, by a first transmission node, a system message change indication signal comprises:
configuring, by the first transmission node, the system message change indication signal in a system message;
wherein configuring, by the first transmission node, the system message change indication signal in a system message comprises:
configuring, by the first transmission node, a location of a resource occupied by the system message change indication signal in the system message;
wherein configuring, by the first transmission node, a location of a resource occupied by the system message change indication signal in the system message comprises at least one of:
configuring, by the first transmission node, a location of a time domain resource occupied by the system message change indication signal in the system message; or
configuring, by the first transmission node, a location of a frequency domain resource occupied by the system message change indication signal in the system message.

2. The method of claim 1, wherein the transmitting, by the first transmission node, the system message change indication signal to a second transmission node comprises:
transmitting, by the first transmission node, the system message change indication signal at a configured location when a system message is changed; and
changing, by the first transmission node, the system message in a specified system message change period after the system message change indication signal is transmitted.

3. The method of claim 1, wherein a set of system messages correspond to one system message change indication signal; or a system message block corresponds to one system message change indication signal; or a master information block, MIB, corresponds to one system message change indication signal, and a system information block, SIB, corresponds to one system message change indication signal.

4. The method of claim 1, wherein when the first transmission node only configures the location of the time domain resource occupied by the system message change indication signal in the system message, the location of the frequency domain resource occupied by the system message change indication signal is predefined, wherein the predefined location of the frequency domain resource comprises one of:
a same location as a location of a frequency domain resource occupied by a physical broadcast channel;
a predefined subcarrier location; or
an entire bandwidth.

5. The method of claim 1, wherein transmitting, by the first transmission node, the system message change indication signal to a second transmission node comprises one of:
transmitting, by the first transmission node, the system message change indication signal to the second transmission node on one orthogonal frequency division multiplexing, OFDM, symbol;
transmitting, by the first transmission node, the system message change indication signal to the second transmission node on a plurality of OFDM symbols;
repeatedly transmitting, by the first transmission node, the system message change indication signal to the second transmission node on the plurality of OFDM symbols; or
repeatedly transmitting, by the first transmission node, the system message change indication signal to the second transmission node on a plurality of sub-frames.

6. A non-transitory computer storage medium storing executive instructions, wherein the executive instructions are configured to execute the method of claim 1.

7. A message transmission method, comprising:
detecting, by a second transmission node, a system message change indication signal sent by a first transmission node; and
acquiring, by the second transmission node, a system message corresponding to the system message change indication signal when the system message change indication signal is detected;
wherein the system message change indication signal sent by the first transmission node comprises:
a system message change indication signal configured by the first transmission node in a system message;
wherein the system message change indication signal configured by the first transmission node in a system message comprises:
a location of a resource occupied by the system message change indication signal in the system message which is configured by the first transmission node;
wherein the location of a resource occupied by the system message change indication signal in the system message which is configured by the first transmission node comprises at least one of:
a location of a time domain resource occupied by the system message change indication signal in the system message which is configured by the first transmission node; or
a location of a frequency domain resource occupied by the system message change indication signal in the system message which is configured by the first transmission node.

8. The method of claim 7, wherein detecting, by a second transmission node, a system message change indication signal sent by a first transmission node comprises:
receiving, by the second transmission node, configuration information about a location of the system message change indication signal sent by the first transmission node; and
detecting, by the second transmission node, the system message change indication signal according to the configuration information.

9. The method of claim 7, wherein acquiring, by the second transmission node, a system message corresponding to the system message change indication signal when the system message change indication signal is detected comprises:

when the system message change indication signal is detected, receiving, by the second transmission node, a changed system message in a specified system message change period after the system message change indication signal is transmitted.

10. The method of claim 7, wherein a set of system messages correspond to one system message change indication signal; or a system message block corresponds to one system message change indication signal; or a master information block, MIB, corresponds to one system message change indication signal, and a system information block, SIB, corresponds to one system message change indication signal.

11. A non-transitory computer storage medium storing executive instructions, wherein the executive instructions are configured to execute the method of claim 7.

12. A message transmission apparatus, applied to a first transmission node and comprising: a processor and a storage device for storing computer executable instructions that when executed by the processor cause the processor to perform the followings to implement the method of claim 1:
configure a system message change indication signal; and
enable the first transmission node to transmit the system message change indication signal to a second transmission node.

13. The apparatus of claim 12, wherein a set of system messages correspond to one system message change indication signal; or a system message block corresponds to one system message change indication signal; or a master information block, MIB, corresponds to one system message change indication signal, and a system information block, SIB, corresponds to one system message change indication signal.

14. A message transmission apparatus, applied to a second transmission node and comprising: a processor and a storage device for storing computer executable instructions that when executed by the processor cause the processor to perform the followings to implement the method of claim 7:
detecting a system message change indication signal sent by a first transmission node; and
when the system message change indication signal is detected, acquiring a system message corresponding to the system message change indication signal.

15. The apparatus of claim 14, wherein the processor is further configured to:
when the system message change indication signal is detected, receive a changed system message in a specified system message change period after the system message change indication signal is transmitted.

* * * * *